United States Patent [19]

Janssen et al.

[11] 4,406,851

[45] Sep. 27, 1983

[54] PROCESS FOR THE MANUFACTURE OF INSULATED WINDING WIRES THROUGH EXTRUSION OF THERMOPLASTICS

[76] Inventors: Harald Janssen, Birkenkamp 1, 2057 Reinbek, Fed. Rep. of Germany; Eberhard Kertscher, Clé des Champs 4, CH-1032 Romanel, Switzerland; Hans-Georg Matthies, Homburgerstrasse 2; Rainer Theysoh, Brüsseler Ring 38, both of 6700 Ludwigshafen, Fed. Rep. of Germany

[21] Appl. No.: 337,005

[22] Filed: Jan. 4, 1982

Related U.S. Application Data

[63] Continuation of Ser. No. 181,229, Aug. 25, 1980, abandoned.

[30] Foreign Application Priority Data

Sep. 1, 1979 [DE] Fed. Rep. of Germany ....... 2935458

[51] Int. Cl.$^3$ ................................................ B29F 3/10

[52] U.S. Cl. .............................. 264/174; 174/110 A; 174/110 D; 174/110 PM; 428/386

[58] Field of Search ....................... 264/174; 428/386; 174/110 A, 110 D, 110 PM

[56] References Cited

U.S. PATENT DOCUMENTS

| | | | |
|---|---|---|---|
| 2,889,304 | 6/1959 | Sheffer et al. | 174/110 PM |
| 3,893,642 | 7/1975 | Van Vlaenderen | 174/110 PM |
| 4,145,474 | 3/1979 | Kertscher et al. | 264/174 |

FOREIGN PATENT DOCUMENTS

| | | | |
|---|---|---|---|
| 599097 | 3/1948 | United Kingdom | 174/110 D |
| 61037 | 10/1948 | United Kingdom | |
| 599248 | 6/1960 | United Kingdom | 174/110 D |

OTHER PUBLICATIONS

Modern Plastics Encyclopedia 1968, Sep. 1967, vol. 45, No. 1A, p. 454.

Seymour; Raymond B., Additives for Plastics, vol. 2, New York, 1978, Academic Press, p. 114.

Bjorksten et al., Polyesters and Their Applications, Reinhold Pub. Corp., New York, 1956, p. 95.

*Primary Examiner*—James H. Derrington

*Attorney, Agent, or Firm*—Michael J. Striker

[57] ABSTRACT

An extrusion process for the manufacture of insulated winding wires. Part crystalline thermoplastic polycondensates with crystallite melting points above 170° C., preferably above 250° C., are extruded. Polyethylene terephthalate is the polycondensate of choice. These are filled with 5–15% by weight titanium dioxide. The result is the avoidance of fissure formation.

1 Claim, No Drawings

PROCESS FOR THE MANUFACTURE OF INSULATED WINDING WIRES THROUGH EXTRUSION OF THERMOPLASTICS

This is a continuation of application Ser. No. 181,229, filed Aug. 25, 1980, now abandoned.

BACKGROUND OF THE INVENTION

The present invention concerns an improved process for the manufacture of insulated winding wires through extrusion of thermoplastics.

Lacquer-insulated winding wires, so-called "enamelled wire", are accurately characterized in the German norm DIN 46435 of April 1977. They appear to a great extent in electrical machine construction, transformer construction and in electronics.

The metal wire, preferably of copper or of aluminum, is insulated with a thin, yet extremely mechanically and thermally resistant synthetic resin enamel coat.

The manufacture of such enamelled wire is performed with wire lacquering machines by several continuous applications of a wire lacquer onto the metal wire. With regard to the noxiousness of the solvent for the wire lacquer which hence becomes an environmental problem, wire lacquer dispersions and aqueous solutions of wire enamel resins as well as fused resin are employed.

All of the known methods are in consideration of the comparatively inferior rate of drawing off therewith attainable very time- and work-consuming.

In the cable industry the extrusion of thermoplastics for thick-wall layers of electrical conductor bundles as well as for the manufacture of conducting wires has been known for some time.

In the older applications (see, e.g. German Allowed Application No. 26 38 763, corresponding to U.S. Pat. No. 4,145,474, which is hereby incorporated by reference) a method for producing lacquer-insulated winding wires by extrusion of thermoplastics is described.

This accomplished, by use of the applicants' executed older application therewith, a decided contribution to the overcoming of the prejudice that the attainment of thinner insulating layers, such as those required by DIN 46435, was not possible with an extrusion method. According to German Allowed Application No. 26 38 763, part crystalline thermoplastic polycondensates with crystallite melting points above 170° C., preferably above 250° C., can be used as thermoplastic material for the extrusion coating of winding wires.

A disadvantage of the part crystalline polycondensates according to German Allowed Application 26 38 763, particularly of polyethylene terephthalate according to Example 1, is—as it was recently found—the tendency of the thermoplastic coating to form cracks.

After a storage time of from a few days to several weeks and preferably after the rewinding of the coated wires there formed concentrically running cracks which were very fine on the surface and which are believed to be connected with the crystallization and shrinking processes of the polymers.

It can be assumed that these cracks, even when they do not penetrate to the metal surface, do represent an interference with some of the properties of the coil wires.

It was therefore surprising to discover an improved process for the manufacture of winding wires through extrusion of thermoplastics, which overcame the disadvantages described.

SUMMARY OF THE INVENTION

The object of the present invention is a process for the manufacture of lacquer-insulated winding wires through extrusion of part crystalline thermoplastic polycondensates with crystallite melting points above 170° C., preferably above 250° C., characterized by the use of 5–15% by weight titanium dioxide filled polyethylene terephthalate.

It could in no manner have been foreseen that by working titanium dioxide into polyethylene terephthalate the tendency of the therewith coated wires to form fissures will be markedly diminished and with titanium dioxide contents above 5% by weight will be completely prevented during a longer period of observation. This discovery is all the more astonishing in that other additives, such as e.g., talcum, kaolin, barium sulfate, are recognized to have no effect in this regard.

So, by way of example, polyethylene terephthalate coated wires with a titanium dioxide content from 4–5% by weight were still acceptable after an observation period of 10 days; upon further examination after an additional 65 days they showed only weakly pronounced fine microfissures.

With 6–7% by weight titanium dioxide the coating was still completely acceptable after a similar observation period; with 8%, 10%, 15% and 30% by weight titanium dioxide and more, the same was true even after an observation period of over 200 days.

The necessity of the minium addition of 5% by weight titanium dioxide thus follows. Considering the fissure formation, it appears that the upper limit of titanium dioxide content is not obvious. There are found with higher titanium dioxide content film inhomogeneities which, p.e. leading to a drop in the breakdown voltage, ought to limit the titanium dioxide contents to a maximum 15% by weight.

As polyethylene terephthalate practically all of the known types applied in the filament and plastics industries, which are produced of terephthalic acid or dimethyl-terephthalate and ethylene glycol, may be used. Furthermore, the rutile and anatase types of titanium dioxide in normal commercial usage, such as those for the coloring of plastics and lacquers, may be used. The working in of the titanium dioxide into the polyethylene terephthalate is effected expeditiously by mixed extrusion.

The novel features which are considered as characteristic for the invention are set forth in particular in the appended claims. The invention itself, however, both as to its construction and its method of operation, together with additional objects and advantages thereof, will be best understood from the following description of specific embodiments read in connection with the accompanying drawing.

DESCRIPTION OF THE PREFERRED EMBODIMENTS

EXAMPLE

Polyethylene terephthalate (relative viscosity 1.33, K-value 52 according to Fikentscher, melting point 255° C.* according to DTA)x with 8% titanium dioxide (anatase type, Kronos AV of the firm of Kronos Titan GmbH) was inserted into the filling vent of one of the extruders described in detail in DT-OS 27 28 883.

*Determination of the relative viscosity of a solution of polyethylene terephthalate (0.5 g) in 100 ml of solvent composed of three parts phenol and two parts o-dichlorobenzene at 25° C. was performed with the aid of a Ubbelohde Viscosimeter Ia. The so-called K-value was calculated according to Fikentscher from the relative viscosity.
xDifferential thermal analysis.

The extrusion temperatures at the individual temperature control points from inlet to nozzle amounted to 240° C./250° C./260° C./270° C./270° C./270° C./280° C.

Annealed copper wire of 0.4 mm diameter was admitted for insertion from an uncoiling device close to a preheating stage, and after passage to the coating zone in the extruder head let through a stripping nozzle, which regulates the thickness of the coating.

After passage to a cooling stage, the coated wire was wound up, the drawing off rate amounted to 200 m/min. The thickness of the applied coating amounted to 31μ and thereby conformed to grade 1 according to German norm DTN 46435 of April 1977.

Characteristics of the Winding Wire

So far as observed, all values according to German norm DIN 46435, page 1, of April 1977.

| | |
|---|---|
| Hardness | H |
| Residual Hardness after contact with the following materials (for a period of 30 minutes at 60° C.) | |
| Ethanol | HB |
| Benzene | HB |
| Water | H |
| Softening Temperature ("Heat Cut through") | 250° C. |
| Adhesion on Tearing | meets test |
| Adhesion after elongation | After prestretching of 20% and winding around its own diameter: meets test |
| Abrasion Force | 4,0 N |
| Heat Shock (after winding around its own diameter) | Acceptable at 200° C. |
| Breakdown Voltage (in twisted condition) | |
| at normal temperature | 4,0 kV |
| at 150° C. | 3,9 kV |
| after 96 hours at 93% relative humidity | 3,0 kV |

-continued

| | |
|---|---|
| Tinning at 375° C. | 2-3 sec |

The coating was even and exhibited—even after rewinding—no fissures (210 day observation period).

In further tests, polyethylene terephthalate with 4%, 5%, 6%, 7%, 10% and 15% by weight titanium dioxide came into use.

The manufacture of insulated winding wires followed the same conditions as described above.

That the tendency to form fissures is a function of the titanium dioxide content is evident from the text of the specification.

It will be understood that each of the elements described above, or two or more together, may also find a useful application in other types of winding wire processes differing from the types described above.

While the invention has been illustrated and described as embodied as a process for the manufacture of insulated winding wires through extrusion of thermoplastics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of manufacturing insulated electric wire of the enamelled wire type comprising the steps of introducing polyethylene terephthalate containing crystallites having a melting point above 170° C. into an extruder and extruding at or above the crystalline melting point of said polyethylene terephthalate, the polyethylene terephthalate onto and around a metal wire so as to form on said wire a thin sheath having a thickness complying with the requirements of German Standard DIN 46435, the improvement which comprises said polyethylene terephthalate being filled with titanium dioxide in an amount of 5 to 15% by weight whereby fissure formation is diminished.

* * * * *